US010324774B2

(12) United States Patent
Ikeda et al.

(10) Patent No.: US 10,324,774 B2
(45) Date of Patent: Jun. 18, 2019

(54) KERNEL PROGRAM INCLUDING RELATIONAL DATABASE, AND METHOD AND APPARATUS FOR EXECUTING SAID PROGRAM

(71) Applicants: Nexty Electronics Corporation, Tokyo (JP); TAKEOKA LAB CORPORATION, Tokyo (JP)

(72) Inventors: Kiyokazu Ikeda, Tokyo (JP); Shozo Takeoka, Tokyo (JP); Takamichi Kono, Tokyo (JP)

(73) Assignees: NEXTY ELECTRONICS CORPORATION, Tokyo (JP); TAKEOKA LAB CORP., Tokyo (JP)

( * ) Notice: Subject to any disclaimer, the term of this patent is extended or adjusted under 35 U.S.C. 154(b) by 97 days.

(21) Appl. No.: 15/313,997

(22) PCT Filed: Jun. 5, 2015

(86) PCT No.: PCT/JP2015/066311
§ 371 (c)(1),
(2) Date: Nov. 25, 2016

(87) PCT Pub. No.: WO2015/186820
PCT Pub. Date: Dec. 10, 2015

(65) Prior Publication Data
US 2018/0232266 A1 Aug. 16, 2018

(30) Foreign Application Priority Data
Jun. 6, 2014 (JP) .................................. 2014-118082

(51) Int. Cl.
*G06F 9/52* (2006.01)
*G06F 9/54* (2006.01)
(Continued)

(52) U.S. Cl.
CPC ............ *G06F 9/545* (2013.01); *G06F 3/0619* (2013.01); *G06F 9/546* (2013.01); *G06F 12/00* (2013.01);
(Continued)

(58) Field of Classification Search
None
See application file for complete search history.

(56) References Cited

U.S. PATENT DOCUMENTS

| 6,549,996 B1 * | 4/2003 | Manry, IV | ............ G06F 9/5016 711/203 |
| 7,702,906 B1 * | 4/2010 | Karr | ........................ H04L 67/10 713/164 |

(Continued)

FOREIGN PATENT DOCUMENTS

| JP | 2006-503369 A | 1/2006 |
| JP | 2007-094879 A | 4/2007 |
| WO | 2004/036350 A2 | 4/2004 |

OTHER PUBLICATIONS

Sep. 1, 2015 Written Opinion issued in International Application No. PCT/JP2015/066311.

(Continued)

*Primary Examiner* — Trang T Doan
(74) *Attorney, Agent, or Firm* — Oliff PLC

(57) ABSTRACT

Provided is a kernel program and so on capable of enhancing the confidentiality of data memorized in a storage device without using a file system on an OS kernel level. The kernel program is mounted on a computer operable to input and output data between an application program and a storage device, and causes the computer to function as: a socket establisher establishing a socket for connecting with the application program; a relational database operable to input and output data from/to the storage device through a device driver; and an access controller inputting a command from (Continued)

the application program through a message structure of the socket then to output the command to the relational database and inputting an execution result from the relational database then to output the execution result through a message structure of the socket to the application program.

7 Claims, 5 Drawing Sheets

(51) Int. Cl.
>   | | |
>   |---|---|
>   | *G06F 16/28* | (2019.01) |
>   | *G06F 12/00* | (2006.01) |
>   | *G09C 1/00* | (2006.01) |
>   | *G06F 3/06* | (2006.01) |
>   | *G06F 13/362* | (2006.01) |
>   | *G06F 21/44* | (2013.01) |
>   | *G06F 21/62* | (2013.01) |

(52) U.S. Cl.
    CPC .......... *G06F 13/362* (2013.01); *G06F 16/284* (2019.01); *G06F 21/44* (2013.01); *G06F 21/629* (2013.01); *G09C 1/00* (2013.01); *G06F 2003/0697* (2013.01)

(56) References Cited

U.S. PATENT DOCUMENTS

| | | |
|---|---|---|
| 2004/0078568 A1 | 4/2004 | Pham et al. |
| 2005/0060568 A1* | 3/2005 | Beresnevichiene ..... G06F 21/10 726/26 |
| 2007/0050620 A1 | 3/2007 | Pham et al. |

OTHER PUBLICATIONS

Sep. 1, 2015 International Search Report issued in International Patent Application No. PCT/JP2015/066311.

Sep. 1, 2015 Written Opinion issued in International Patent Application No. PCT/JP2015/066311.

\* cited by examiner

KERNEL PROGRAM INCLUDING RELATIONAL DATABASE, AND METHOD AND APPARATUS FOR EXECUTING SAID PROGRAM

TECHNICAL FIELD

The present invention relates to technology of a kernel program in an OS (Operating System).

This application claims the benefit of priority under the Paris Convention from Japanese patent application No. 2014-118082, filed on Jun. 6, 2014, which is incorporated herein by reference in accordance with PCT rule 20.6.

BACKGROUND ART

A kernel program of an OS represented by Unix (registered trademark) and Windows (registered trademark) is configured to include a file system from the very nature. The file system is a system having a function of managing files (data) stored in (auxiliary) storage devices such as an HDD (Hard Disk Drive) or an SSD (Solid State Drive). The file system provides to an application program an abstract (access) interface used for operating files while concealing the actual state of storing data in the storage device from the application program.

The file system generally presents the state of data in such a way that all the files constitutes a hierarchical structure under a root directory. The file system is further adapted for using a mount operation to subordinate one directory to another directory, which enables the application program to specify a target file by indicating the directory (hierarchical position) and the file name.

The file system generally has a structure which gives, in every file, access authorities of "read r", "write w" and "execute e" to each of "owner", "group" and "other users". The access authorities are expressed, e.g. as 3 bits per one user, 9 bits in a total, as follows.

| "owner" | "group" | "other users" |
|---|---|---|
| r, w, e | r, w, e | r, w, e |

An example of the result of referring to the access authorities by using ls command of Unix (registered trademark) is as follows.

% ls -l owner.c
-rw-r--r-- 1 ikeda toyotsu 375 May 14 10:35 owner.c

This referring result shows that the owner can perform reading and writing however is inhibited from directly doing execution, and that the group members and other users can do reading however are allowed to perform neither writing nor executing. Using such a form, the file system manages the access authorities of each file.

CITATION LIST

Patent Documents

Patent Document No. 1: Japanese Unexamined Patent Application Publication No. 2006-503369

SUMMARY OF THE INVENTION

Problem to be Solved by the Invention

The conventional file system as described above allows a person stealing the owner authority (or administrator authority) to readout all the files under the root directory. One of the conventional solutions of this problem is to ensure the security of files memorized in storage devices on an application level. While, a conventional kernel program of an OS provides only a quite simple authentication of access authority because the kernel program is required to perform processes at a higher speed with less operation quantity.

However, in recent years, an enormous number of computers are connected to communication networks under the situation that smartphones and tablet-type terminals have become much popular. Therefore, the operation quantity needed for ensuring the security on an application level extremely increases. Nevertheless, in the file system on an OS kernel level, storage devices just accumulate files in a directory form. As a result, if broken is the application level security, it becomes possible to steal all the files memorized under the root directory in the storage devices. Particularly, the security problem becomes more serious in the case that the data memorized in the file system are personal information.

Here, generally, kernel programs are products obtained by pursuing performing highly accurate processing with an extremely high speed. Therefore, there are only several kinds of kernel programs such as Unix (registered trademark), Windows (registered trademark), etc. even if seen globally. Due to this situation, the configuration of file system on an OS kernel level has been unchanged and become outdated.

It is therefore an object of the present invention to provide a kernel program, a method and an apparatus capable of enhancing the confidentiality of data memorized in a storage device without using a file system on an OS kernel level.

Means to Solve the Problem

According to the present invention, there provided is a kernel program to be mounted on a computer operable to input and output data between an application program and a storage device, the kernel program causing the computer to function as:

a socket establisher establishing a socket for connecting with the application program;

a relational database operable to input and output data from/to the storage device through a device driver; and an access controller inputting a command from the application program through a message structure of the socket then to output the command to the relational database, and inputting an execution result from the relational database then to output the execution result through a message structure of the socket to the application program, the kernel program being configured without using a file system and a system call used for the file system, and data managed by the relational database being disposed only within the storage device through the device driver.

As an embodiment of the kernel program according to the present invention, it is preferable that the relational database is a light SQL database in which a client and a RDBMS (Relational DataBase Management System) server are integrated.

As another embodiment of the kernel program according to the present invention, it is also preferable that the kernel program further causes the computer to function as:

an access authenticator managing a first secret key and a first public key to send the first public key to the application program, and receiving, from the application program managing a second secret key and a second public key, the second public key, wherein a message to be sent through the socket to the application program is encrypted by using the first public key, and a message received from the application program through the socket is encrypted with the second public key.

As another embodiment of the kernel program according to the present invention, it is also preferable:

that the access authenticator generates a rights that is an access authority for the application program and encrypts the rights using the second public key then to send the encrypted rights to the application program;

that the message received from the application program through the socket includes the rights as well as the command; and that the access controller decrypts the massage received from the application program using the first secret key, performs an authentication process to the rights included in the massage, and then outputs the command to the relational database only when succeeding in the authentication process.

As another embodiment of the kernel program according to the present invention, it is also preferable:

that the access authenticator memorizes in advance a password for authentication; and that, when receiving an encrypted password from the application program, the access authenticator decrypts the received password using the first secret key, performs an authentication process with judging whether the decrypted password coincides with the pre-memorized password or not, and then generates the rights only when succeeding in the authentication process.

According to the present invention, there provided is an apparatus provided with a kernel program operable to input and output data between an application program and a storage device, the apparatus comprising:

a socket establisher establishing a socket for connecting with the application program;

a relational database operable to input and output data from/to the storage device through a device driver; and an access controller inputting a command from the application program through a message structure of the socket then to output the command to the relational database, and inputting an execution result from the relational database then to output the execution result through a message structure of the socket to the application program, the kernel program being configured without using a file system and a system call used for the file system, and data managed by the relational database being disposed only within the storage device through the device driver.

According to the present invention, there provided is a method of executing a kernel program operable to input and output data between an application program and a storage device, the kernel program including a relational database operable to input and output data from/to the storage device through a device driver, and the method comprising:

a step of establishing a socket for connecting with the application program; and a step of inputting a command from the application program through a message structure of the socket then to output the command to the relational database, and of inputting an execution result from the relational database then to output the execution result through a message structure of the socket to the application program, the kernel program being configured without using a file system and a system call used for the file system, and data managed by the relational database being disposed only within the storage device through the device driver.

Advantageous Effects of the Invention

A kernel program according to the present invention, and a method and an apparatus for executing the kernel program enable to enhance the confidentiality of data memorized in a storage device without using a file system on an OS kernel level.

EMBODIMENTS OF THE INVENTION

Illustrative embodiments of the present invention will be described below with reference to the drawings.

Figure 1:
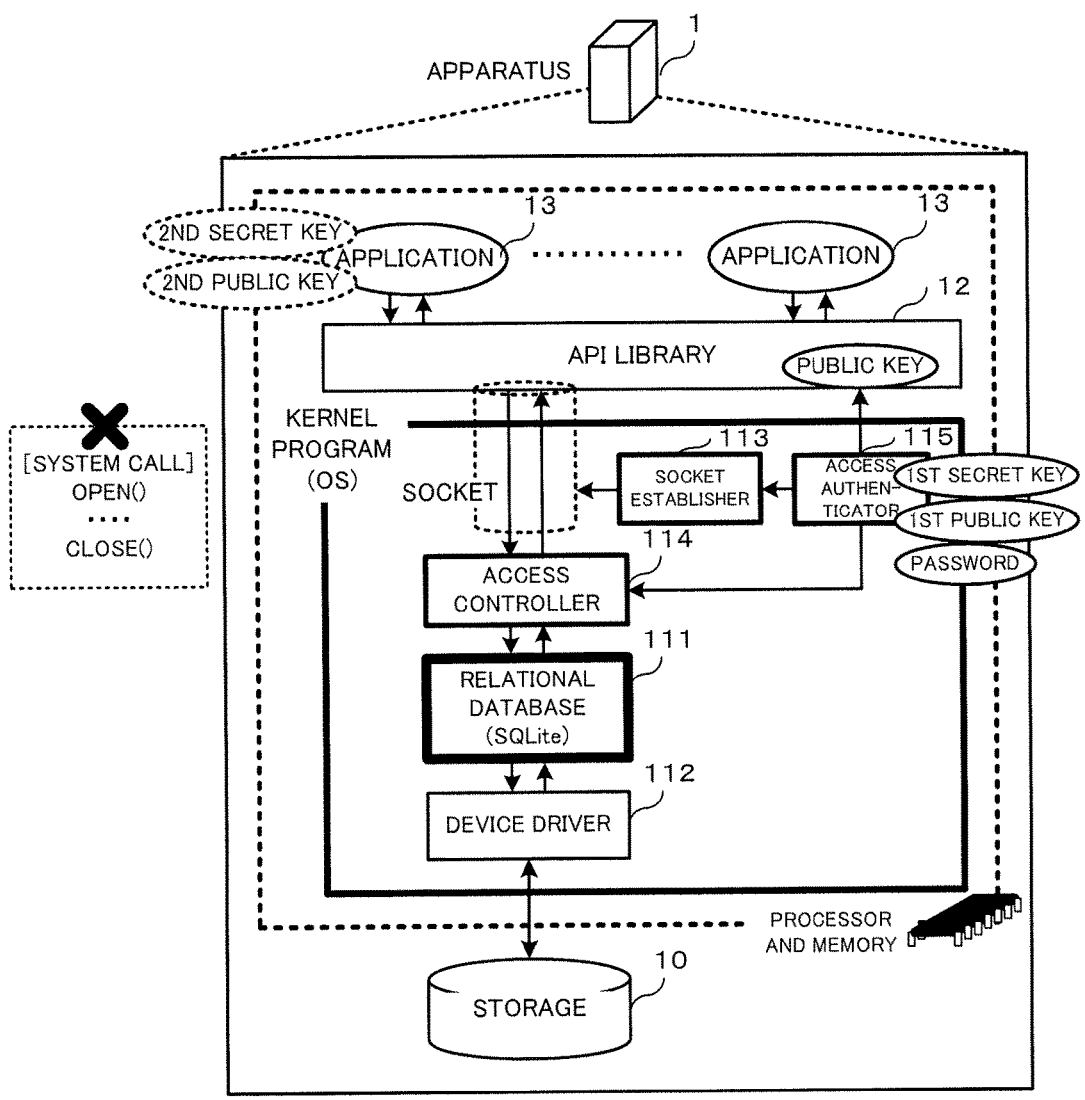
FIG. 1 is a functional block diagram illustrating one embodiment of an apparatus provided with a kernel program according to the present invention.

FIG. 1 is a functional block diagram illustrating one embodiment of an apparatus provided with a kernel program according to the present invention.

As shown in FIG. 1, an apparatus 1 is configured to include a processor (computer) and a storage device 10 such as an HDD or an SDD, and to be provided with, as software, a kernel program 11 functioning by being executed on the mounted processor, an API (Application Programming Interface) library 12, and one or more application program(s) 13. Further, the kernel program 11 according to the present invention comprises a relational database 111, a device driver 112, a socket establisher 113, an access controller 114, and an access authenticator 115. Here, the processing flow visualized by arrows connecting the functional units in the figure can be understood as a method for executing the kernel program.

(API library 12) The API library 12 is adapted for implementing mutual conversion between a language used in the application program 13 and a query language, namely a language used in the relational database. The application-side interface of the API is described as a system programming by using a system call interface of the kernel program 11.

Here, the kernel program 11 according to the present invention is constructed in such a way to remove low-level system calls associated with the existing file system. For example, the following system calls may be removed.

open( ) close( )

In the case of breaking the application level security then to access the file system with an owner authority, low-level system calls such as open( ) may open the entire files. As a result, it becomes easy to read out all the files. To guard against the attack, in the kernel program 11 according to the present invention, the file system is removed and thus excluded are associated system calls such as open( ) and close( ).

(Relational database 111) The kernel program 11 according to the present invention is provided with a relational database 111 instead of the existing file system. Generally, even the administrator authority cannot read from nor write to memory area corresponding to a kernel space. Here, the present invention arranges, within a kernel space, program codes and operation memory areas as well as the relational database, which effects extremely high confidentiality of the database.

The relational database 111 is adapted to input and output data from/to the storage device 10 through the device driver 112. There may be employed as the relational database 111 a light SQL database in which a client and a RDBMS server are integrated and the whole database can be treated as a single file. Specifically, "SQLite3" may be adopted as the light SQL database.

Here, a notable point is that, unlike a file system having directory structure, a SQL database prevents data from being taken out in file units in principle. That is, the SQL database is always configured to output a response (execution result) when inputting a query. Therefore, even a malicious third party, who succeeded in stealing the entire database, could extremely hardly take out an individual file from the stolen database. Thus, the present invention implements the above SQL database in a kernel program, instead of the existing file system, thereby to greatly improve the security of file management.

The SQL database determines every way of memorizing in the storage device 10. The memory structure in the storage device 10 is constructed, based on the SQL database, as an in-memory database with a high efficiency so as not to recognize the structure from outside. By using this kind of SQL database, even in the case of breaking the security, it is still impossible to read out nor tamper with each file.

Here, the conventional SQL database is executed as an application program and thus files that are the entity of the database are also memorized in the existing file system. This kind of database disposed on the existing file system allows a person having administrator authority to collectively read out all the files by using commonly-used commands.

By contrast, the files of the SQL database according to the present invention are memorized as they are in the storage device through the device driver. This means that the SQL database directly manages the storage device area. Therefore, because the database of the present invention is not disposed on the existing file system, even a person with OS administrator authority could copy neither all nor a part of files of the database.

it is impossible to find out the location of the data entity of the SQL database on the storage device 10 unless intimately understanding both of the internal data structure of the database and the method for managing the structure. Therefore, it is extremely difficult to read out or tamper with the database data on the storage device 10 in a significant form. Further, because neither program codes nor memory area information in the kernel space can also be taken out, there cannot be analyzed the location of any data on the storage device 10 as well as program codes and memory space of the SQL database itself.

As the SQL database according to the present invention, "SQLite" can be used, which is a built-in type database managed using a DBMS (DataBase Management System) in combination with PHP. The SQLite is not based on any concept of server unlike a client-server type DBMS such as MySQL and PostgreSQL. That is to say, the SQLite has a constitution where a server and a client are integrated and thus the whole content of the database is stored in a single local area.

Figure 2:
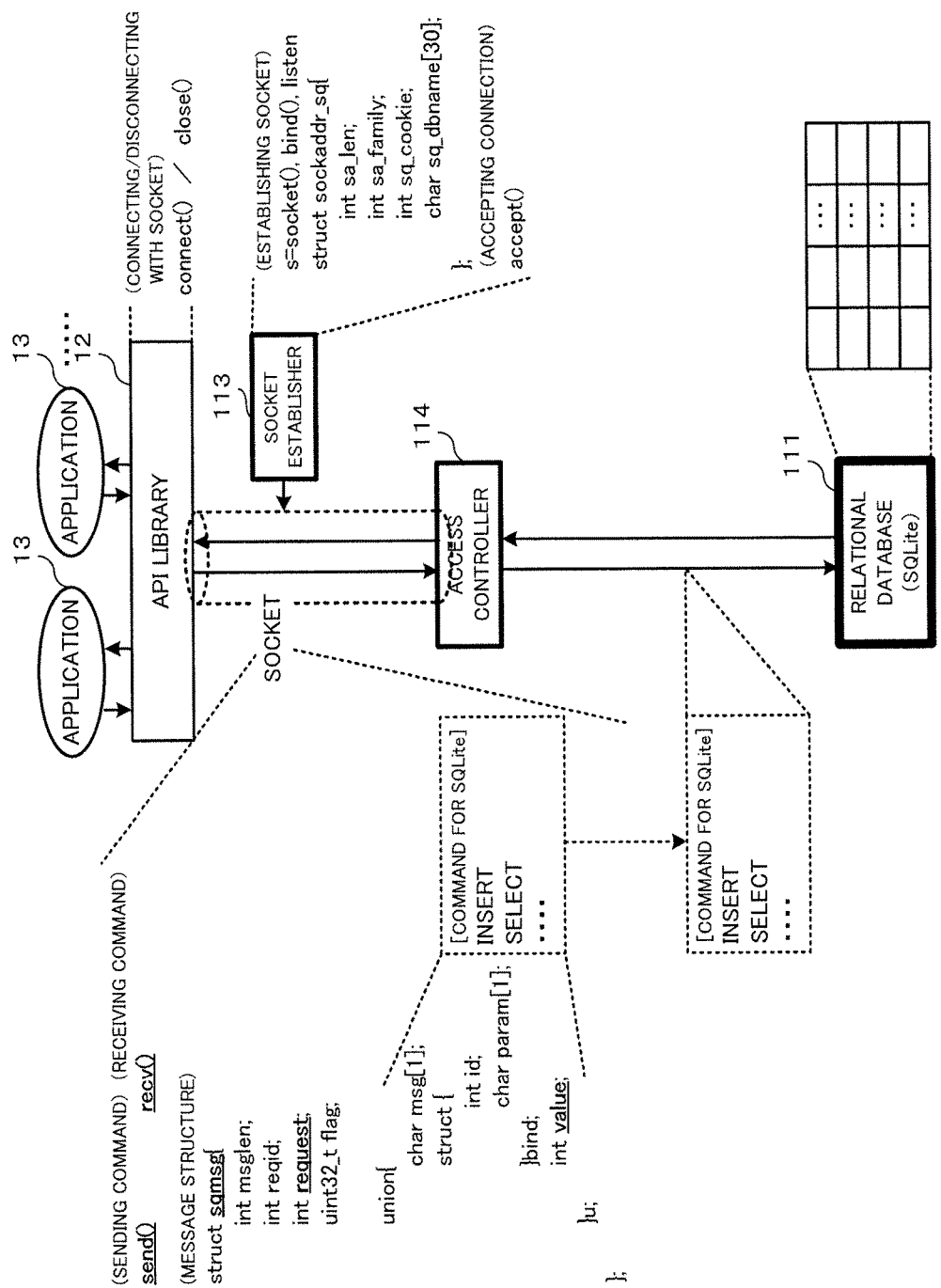
FIG. 2 is a schematic diagram for explaining with described codes an embodiment of establishing a socket and sending and receiving messages.

FIG. 2 is a schematic diagram for explaining with described codes an embodiment of establishing a socket and sending and receiving messages. And FIG. 3 is a sequence diagram showing an embodiment of a sequence process among the API library, the socket establisher and the access controller.

Figure 3:
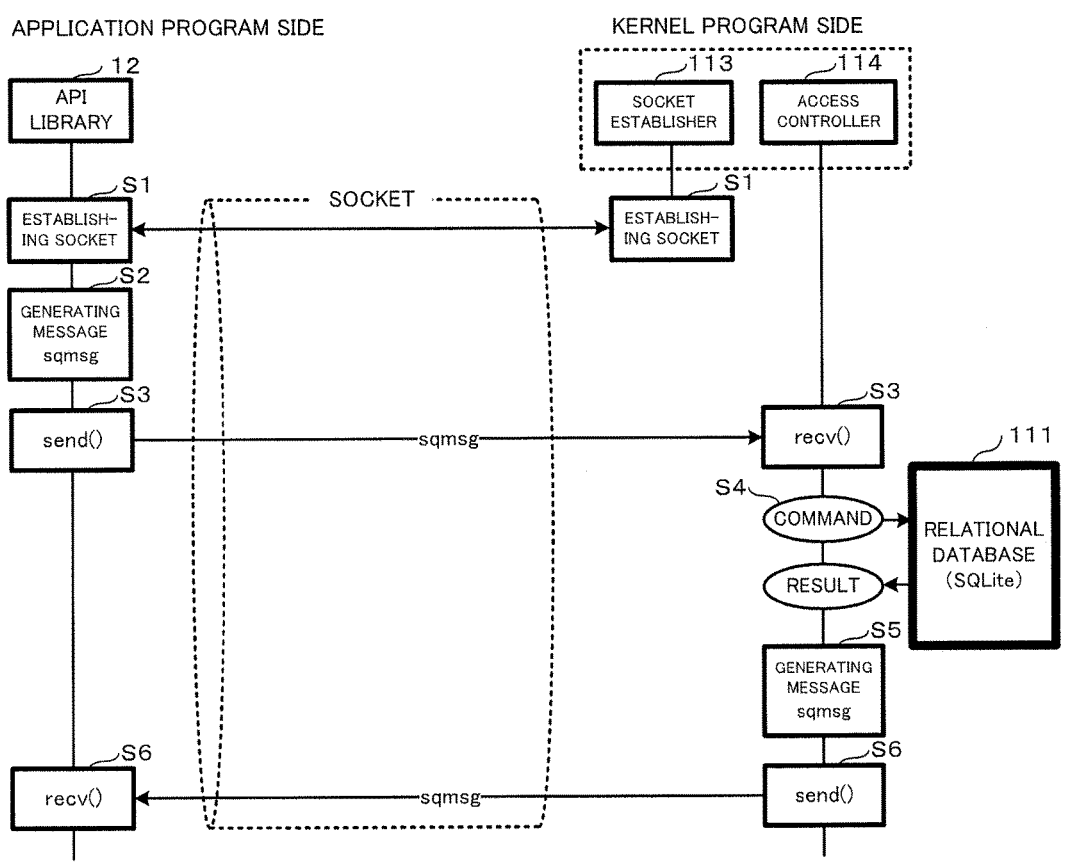
FIG. 3 is a sequence diagram showing an embodiment of a sequence process among the API library, the socket establisher and the access controller.

(Socket establisher 113) The socket establisher 113 is configured to establish a socket for connecting with the application programs 13 (see step S1 in FIG. 3). The socket is established in such a form that the API library 12 (the application program side) and the kernel program 11 are considered as a client and a server respectively. Whenever an application program 13 accesses data, an access message with a form of query described in SQL language is sent through the established socket. The socket mediates a pair communicating with each other using an IP address and a port number set based on TCP/IP. In the present embodiment, both of the IP address and the port number act as a local address.

The socket conceals completely to the application programs 13 an abstract file configuration and a memory space structure of the database thus to secure high safety. The following is an example of a system call by which the socket is established (see the socket establisher 113 in FIG. 2).

socket(domain, type, protocol): generating a socket on the kernel program side
        domain=AF-UNIX: local address (UNIX domain)
        type: communication method type
        protocol: protocol
    bind: determining the server name and the port number on the kernel program side
    listen: starting accepting the socket on the kernel program side
    connect(s, dbname, namelen): connecting with the socket on the API side.
        s: socket number
        dbname: SQLite3 database name
        namelen: name size
    accept(s, name, namelen): accepting connect on the kernel program side
        s: socket number
        dbname: SQLite3 database name
        namelen: name size
    close: Removing the socket on the API side The above-described code "domain=AF-UNIX" realizes the establishment of socket communication closed within a single apparatus without using any IP address nor port number. Thus, the prevention of communication connection with any other apparatus achieves high security.

After establishing the socket, the application programs 13 (the API library 12) can access the SQL database disposed within the kernel program 11 by using a system call for socket communication. Here, the API library 12 and the kernel program 11 are communicated with each other using a message structure "sqmsg" (see step S2 in FIG. 3) as follows.

```
struct sqmsg {
    int msglen;
    int reqid;
    int request;
    uint32_t flag;
```

```
                union {
                    char msg[1];
                    struct {
                        int id;
                        char param[1];
                    } bind;
                    int value;
                } u;
            }
```

(Transmission of query) The API can send a query to the kernel program by executing the following process of:

setting a query in "sqmsg.msg[ ]" then to set "sqmsg.request=1" (when executing a preregistered query, setting a parameter in "sqmsg.msg[ ]" using a BSON form then to set "sqmsg.request=2");

setting "sqmsg.flag=1" when requesting immediate execution;

the API's sending "sqmsg" to the kernel program by using "send( )/write( )" (see step S3 in FIG. 3); and the kernel program's receiving the sqmsq by using "recv( )/read( )" (see step S3 in FIG. 3).

(Reception of execution result) In order to return the execution result to the API, the kernel program'executes the following process of:

setting "sqmsg.request=0" (setting "sqmsg.request" to zero);

setting "sqmsg.u.value" to a success/failure value (sqmsg.u.value=0 if success, sqmsg.u.value=−1 if failure);

setting the execution result in an sqmsg structure (when executing a preregistered query, setting a parameter in "sqmsg.payload[ ]" using a BSON form then to set "sqmsg.request=3");

the kernel program's sending "sqmsg" to the API by using "send( )/write( )" (see step S6 in FIG. 3); and the API's receiving the sqmsq by using "recv ( )/read( )" (see step S3 in FIG. 6).

Here, the BSON is a binary format, and is described in the case of JSON, for example, as follows.

INSERT INTO A VALUES (:a:b:c);

(Access controller 114) The access controller 114 is configured to input a command from an application program 13 through a message structure of the socket then to output the command to the relational database 111. The access controller 114 is further adapted to input an execution result from the relational database 111 then to output the execution result through a message structure of the socket to the application program 13.

Here, a specific example of the relation between the interface on the application program side and the system call on the kernel program side in the API library 12 will be described. (1) First, the following functions are prepared to put queries described in SQL language together in a BSON format.

int ksqlite_bind_int(struct ksqlite_stmt *stmt, char *pchar, int value)
    int ksqlite_bind_double(struct ksqlite_stmt *stmt, char *pchar, double value)
    int ksqlite_bind_int64(struct ksqlite_stmt *stmt, char *pchar, int64_t value)

The application program 13 uses these functions to write commands given to the relational database 111 on a memory buffer of the application program.

(Generation of query)

```
    bson_init(&bs);                              /* Initialization of the area for BSON query */
    bson_append_string(&bs, ":a", "AAA");        /* preparing query */
    bson_append_string(&bs, ":b", "GEGE" );
    bson_append_int(&bs, ":c", 10);
    bson_finish(&bs);
```

(2) Next, the application program prepares to send the query using "ksqlite_prepare( )"

```
    sqm->request=2;
    sqm->msglen=sizeof(struct sqmsg)+bson_size(&bs);
    printf("SIZE % d¥n", sqm->msglen);
    memcpy(sqm->u.msg, bson_data(&bs), bson_size(&bs));
    bson_destroy(&bs);
```

(3) Then, the application program sends the command to within the kernel program.

(Transmission of Query)

```
    send(s, sqm, sqm->msglen, 0);
    printf("SEND END C¥n");
```

(4) In response to the command, a plurality of execution results generated in the relational database 111 may be sent in a bulk. The application program obtains these execution results by using "ksqlite_step( )". The "ksqlite_step( )" carries out calling repeatedly until reading the whole execution results out.

(Receiving results of execution for query)

```
    bzero(sqm->u.msg, 300);                      /*clearing reception area*/
    while(sqm->flag == 2 ){                      /*checking continuing flag*/
        rcvsize =recv(s, sqm, 500, 0);           /*receiving*/
        printf("rcvsize%d %d¥n", rcvsize, sqm->msglen);
        bson_init_finished_data(&bs, &sqm->u.msg, 0);
        bson_print(&bs);                         /*displaying data (for debug)*/
        bson_destroy(&bs);
    }
```

Here, the "continuing flag" in the above data enables to judge whether the read data is followed by a continued data or not.

(Access authenticator 115) The access authenticator 115 is configured to authenticate access authorities of the application programs 13, and manages and controls secret keys and public keys to be used.

(1) The access authenticator 115 of the kernel program 11 manages a "first secret key" and a "first public key" and sends the "first public key" to the application program 13 thereby to open it.

The application program 13 uses the received first public key to encrypt a message to be sent through the socket to the kernel program 11.

(2) The application program 13 manages a "second secret key" and a "second public key" and sends the "second public key" to the access authenticator 115 of the kernel program 11 thereby to open it.

The kernel program 11 uses the received second public key to encrypt a message to be sent through the socket to the application program 13. Here, the access authenticator 115 of the kernel program 11 sets in advance a password for authentication.

Figure 4:
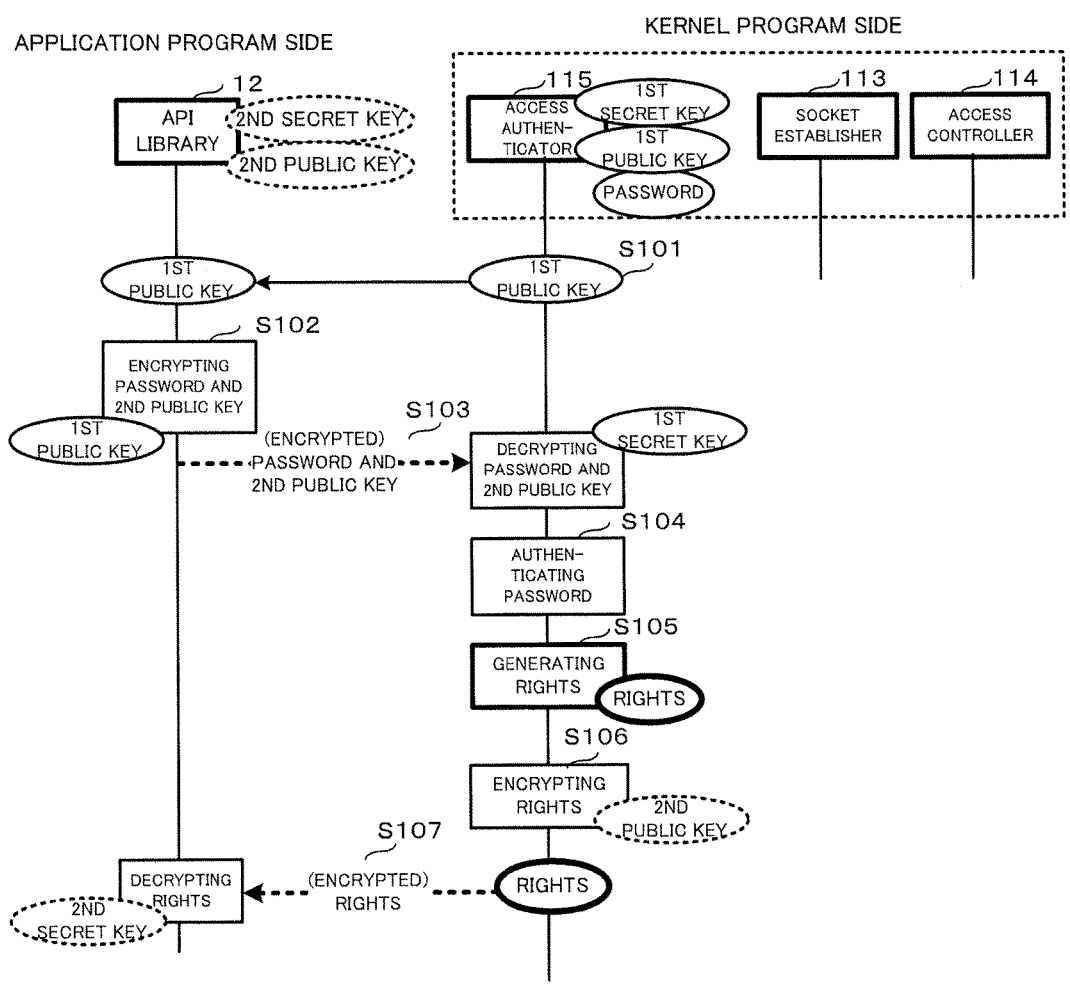
FIG. 4 is a first sequence diagram showing an embodiment of the sequence process between the API library and the access authenticator.

FIG. 4 is a first sequence diagram showing an embodiment of the sequence process between the API library and the access authenticator. As shown in the figure, the API library is disposed on the application program side.

(S101) The access authenticator 115 of the kernel program 11 sends in advance the "first public key" to the API library 12.

(S102) When accessing the relational database of the kernel program 11, the API library 12 first encrypts the held "password" and the generated "second public key" by using the first public key received in step S101.

(S103) The API library 12 sends the encrypted massage (the encrypted password and second public key) to the kernel program 11 using a system call. For example, the following system call is set separately.
sqlite3_set_authorizer( )

(S104) The access authenticator 115 of the kernel program 11 decrypts by using the "first secret key" the message received with a system call thus to obtain the password and the second public key. Then, the access authenticator 115 executes an authentication process with judging whether the obtained password coincides with the preset password or not.

(S105) When succeeding in the password authentication, the authenticator 115 of the kernel program 11 generates "rights". The rights means an access authority to access the database of the kernel program 11.

(S106) The access authenticator 115 of the kernel program 11 uses the "second public key" to encrypt the rights.

(S107) The access authenticator 115 of the kernel program 11 returns to the API library 12 the encrypted rights as a response to the previous system call.

Then, the API library 12 (the application program 13) decrypts the received encrypted rights by using the "second secret key" to obtain the rights. After that, whenever sending to the SQL database a command, the API library 12 always adds the rights to the command to be sent.

Here, the process executed by the application obtaining the rights through the API library 12 may give the rights to processes of other reliable applications. That is, a plurality of processes can share a single access authority to access the kernel program. Because the rights of its own is encrypted by a public key method, it is much difficult to fraudulently acquire the rights.

Figure 5:
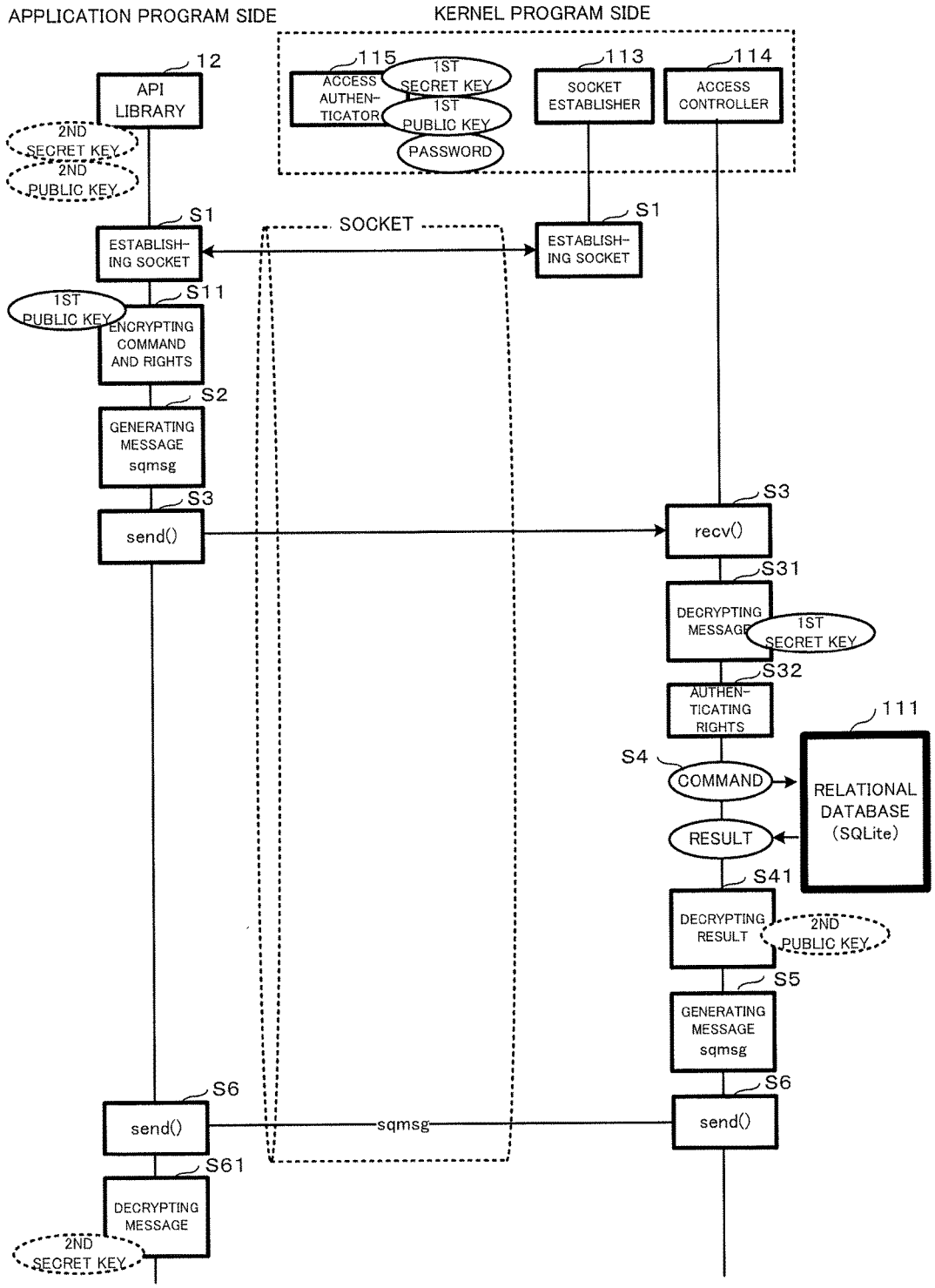
FIG. 5 is a second sequence diagram showing an embodiment of the sequence process between the API library and the access authenticator.

FIG. 5 is a second sequence diagram showing an embodiment of the sequence process between the API library and the access authenticator. The sequence process shown in FIG. 5 follows the sequence process shown in FIG. 4.

(S1) After the kernel program 11 succeeds in authenticating the access (after the rights is sent to the API library 12), the socket establisher 113 establishes a socket for connecting with the API library 12 (as the above step S1 in FIG. 3).

(S11) The API library 12 uses the "first public key" to encrypt the "command" for accessing the SQL database of the kernel program 11 as well as the previously obtained "rights" (see FIG. 4).

(S2) The API library 12 generates a message structure "sqmsg" including the encrypted message (command and rights).

(S3) The API library 12 uses "send( )/write( )" to send the sqmsg to the kernel program. The kernel program receives the sqmsg using "recv( )/read( )".

(S31) The access controller 114 of the kernel program decrypts the massage included in the sqmsg by using the "first secret key".

(S32) The access controller 114 of the kernel program judges, as a rights authentication, whether nor not the decrypted rights matches the rights generated by itself.

(S4) only if succeeding in the rights authentication, the access controller 114 outputs the decrypted rights to the relational database 111. Therefore, only commands of application programs that pass the above inspection can realize the access to the SQL database. Receiving such a command, the relational database 111 returns the execution result.

(S41) The access controller 114 of the kernel program uses the "second public key" to encrypt the execution result received from the relational database 111.

(S5) The access controller 114 generates a message structure "sqmsg" including the encrypted execution result.

(S6) The access controller 114 uses "send( )/write( )" to send the sqmsg to the API library 12. The API library 12 receives the sqmsg by using "recv( )/read( )".

(S7) The API library 12 uses the "second secret key" to decrypt the massage included in the sqmsg.

As explained above in detail, the kernel program according to the present invention, and the method and the apparatus for executing the kernel program allow improving the confidentiality of data stored in a storage device without using a file system on an OS kernel level.

According to the present invention, a database, which is usually carried out in a user space as an application, is arranged within a kernel space. Thus, the access to the database can be blocked and the operation memory area of the database can be concealed. That is to say, even an administrator authority to the OS could read out neither program codes of the database nor any data of the memory area, which realizes extremely high confidentiality.

The apparatus provided with the kernel program according to the present invention is best suited as a database for managing personal data. Recently, there often occurs a problem that a malicious third party steals through a communication network the personal data stored in a personal terminal. The present invention provides a solution against the problem, which prevents the whole personal data from being stolen. Particularly, it is preferable that the apparatuses according to the present invention are applied to memory apparatuses for a computer system mounted on an automobile. An automatic driving technology, which will be realized in the future, must require to improve the confidentiality and tamper resistance of data stored in each automobile. Further, by utilizing the apparatus of the present invention in each individual owner, there achieved is advanced security to personal information.

Many widely different alternations and modifications of the above-described various embodiments of the present invention may be constructed without departing from the spirit and scope of the present invention. All the foregoing embodiments are by way of example of the present invention only and not intended to be limiting. Accordingly, the present invention is limited only as defined in the following claims and equivalents thereto.

REFERENCE SIGNS LIST 1 apparatus; 10 storage device; 11 kernel program; 111 relational database; 112 device driver; 113 socket establisher; 114 access controller; 115 access authenticator; 12 API library; and 13 application program.

What is claimed is:

1. A non-transitory computer readable storage medium storing a kernel program operable to input and output data between an application program and a storage device, the kernel program causing a computer to function as:
a socket establisher establishing a socket connecting to the application program;

a relational database operable to input and output data from/to the storage device through a device driver; and an access controller configured to: (i) input a command from the application program by using a message structure of the socket to output the command to the relational database, and (ii) input an execution result performed in response to the command in the relational database to output the execution result by using a message structure of the socket to the application program, wherein the kernel program is configured without using a file system and a system call used for the file system, and data managed by the relational database is stored only in the storage device.

2. The non-transitory computer readable storage medium as claimed in claim 1, wherein the relational database is a light SQL database in which a client and a RDBMS (Relational DataBase Management System) server are integrated.

3. The non-transitory computer readable storage medium as claimed in claim 1, the kernel program further causing the computer to function as:

an access authenticator configured to manage a first secret key and a first public key to send the first public key to the application program, and to receive, from the application program managing a second secret key and a second public key, the second public key, wherein a message to be sent through the socket to the application program is encrypted by using the second public key, and a message received from the application program through the socket is encrypted with the first public key.

4. The non-transitory computer readable storage medium as claimed in claim 3, wherein the access authenticator generates a rights that is an access authority for the application program and encrypts the rights using the second public key then to send the encrypted rights to the application program, the message received from the application program through the socket includes the rights as well as the command, and the access controller decrypts the message received from the application program using the first secret key, performs an authentication process to the rights included in the message, and then outputs the command to the relational database only when succeeding in the authentication process.

5. The non-transitory computer readable storage medium as claimed in claim 4, wherein the access authenticator memorizes in advance a password for authentication, and when receiving an encrypted password from the application program, the access authenticator decrypts the received password using the first secret key, performs an authentication process with judging whether the decrypted password coincides with the pre-memorized password or not, and then generates the rights only when succeeding in the authentication process.

6. An apparatus provided with a kernel program operable to input and output data between an application program and a storage device, the apparatus comprising:

a memory storing a relational database operable to input and output data from/to the storage device through a device driver; and a processor operatively coupled to the memory, the processor being programmed to:

establish a socket connecting to the application program;

input a command from the application program by using a message structure of the socket to output the command to the relational database; and input an execution result performed in response to the command in the relational database to output the execution result by using a message structure of the socket to the application program, wherein the kernel program is configured without using a file system and a system call used for the file system, and data managed by the relational database is stored only in the storage device.

7. A method of executing a kernel program operable to input and output data between an application program and a storage device, the kernel program including a relational database operable to input and output data from/to the storage device through a device driver, the method comprising:

establishing a socket connecting to the application program;

inputting, by an access controller, a command from the application program by using a message structure of the socket to output the command to the relational database; and inputting, by the access controller, an execution result performed in response to the command in the relational database to output the execution result by using a message structure of the socket to the application program, wherein the kernel program is configured without using a file system and a system call used for the file system, and data managed by the relational database is stored only in the storage device.

* * * * *